Oct. 27, 1925.

E. B. EVERLY

CASTER

Filed May 27, 1925

Inventor
E. B. Everly

Patented Oct. 27, 1925.

1,559,078

UNITED STATES PATENT OFFICE.

EDGAR B. EVERLY, OF PACIFIC GROVE, CALIFORNIA.

CASTER.

Application filed May 27, 1925. Serial No. 33,248.

*To all whom it may concern:*

Be it known that I, EDGAR B. EVERLY, a citizen of the United States, residing at Pacific Grove, in the county of Monterey and State of California, have invented a new and useful Improved Caster, of which the following is a specification.

This invention relates to casters used in connection with furniture for supporting the furniture and permitting the furniture to be rolled over the floor surface.

An important object of the invention is to provide means for supporting a caster to insure the free movement of the caster in a horizontal plane, thereby eliminating any possibility of the caster being moved laterally or slid over the surface to injure the floor surface.

A still further object of the invention is the provision of a retaining member employed for retaining the bearing and caster against displacement under ordinary conditions.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
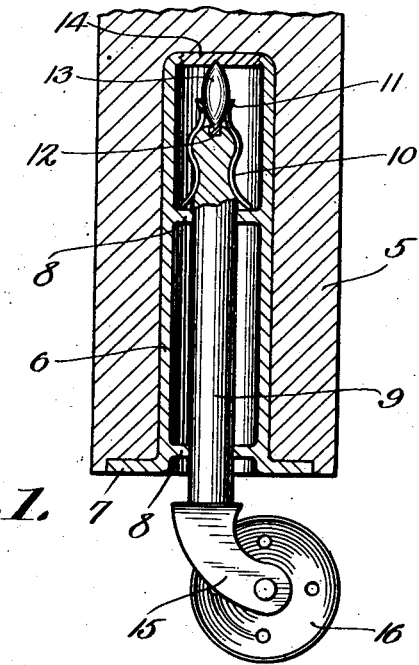
Figure 1 is a longitudinal sectional view through a furniture leg equipped with a caster constructed in accordance with the present invention.
Figure 2:
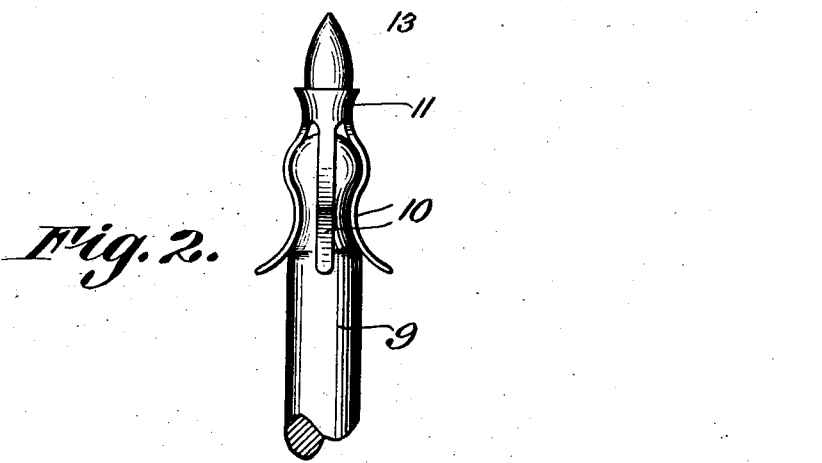
Figure 2 is a fragmental elevational view illustrating the upper extremity of the caster shank.

Referring to the drawing in detail, the reference character 5 indicates the leg of a table, chair or the like which is supplied with the usual caster opening.

Positioned within the caster opening is a tubular housing indicated at 6 which is formed with a flange 7 adapted to bear against the lower end of the leg in which the caster is positioned, to support the weight of the furniture.

Formed integral with the housing 6 are spaced bearings 8 that are provided with openings to receive the shank 9 of the caster, the shank 9 being relatively long, the upper end thereof being disposed within the upper portion of the housing 6 as shown by Figure 1 of the drawing.

The upper end of the shank 9 is provided with a depressed portion in which the curved spring fingers 10 are positioned, to the end that the spring fingers 10 grip the upper end of the shank 9 and hold the retaining member 11 formed integral with the upper ends of the fingers 10 in position. Thus it will be seen that the lower ends of the fingers 10 engage the upper bearing 8 to insure against the shank 9 falling from its position within the housing 6 should the furniture supplied with the caster be lifted.

A recessed portion is provided at the upper extremity of the shank 9 and is designed to accommodate the bearing 12 constructed of hardened material to withstand the weight and pressure of the furniture and persons seated thereon.

Positioned in the retaining ring 11 is a bearing 13 which is provided with tapered extremities the upper tapered extremity being fitted in a suitable recessed portion provided in the removable plug 14. The lower end of the shank 9 is provided with the fork 15 which is of the usual construction and in which the caster or wheel 16 is positioned.

From the foregoing it will be obvious that due to this construction an exceptionally sensitive bearing for the caster is provided, which will permit of free movement of the caster to the end that the caster will properly align itself when being pushed over the floor surface, eliminating the side movement of the caster which will scrape the floor and damage the surface.

I claim:—

1. In a caster construction, a tubular housing, an upper and lower bearing formed in the housing, a caster shank extending through the bearings and having a head at its upper end, a resilient member having its lower end resting on the upper bearing, and adapted to grip the head of the shank, and a bearing supported in the resilient member.

2. In a caster construction, an upper and lower bearing, a caster shank adapted to be positioned within the bearings, a bearing support including spring fingers adapted to grip the upper end of the shank, said spring fingers having their lower ends resting on the upper bearing, and a removable bearing supported by the spring fingers and adapted to rest against one end of the housing.

In testimony that I claim the foregoing as my own, I have hereto affixed my signature.

EDGAR B. EVERLY.